United States Patent [19]
Miyazaki et al.

[11] Patent Number: 5,108,228
[45] Date of Patent: Apr. 28, 1992

[54] METHOD OF LINING BRANCH PIPE PORTION OF UNDERGROUND MAIN PIPE WITH RIGID PLASTICS TUBE

[75] Inventors: Yasuo Miyazaki, Osaka; Akira Kamide, Higashiosaka; Shigeki Watari, Osaka, all of Japan

[73] Assignee: Osaka Bousui Construction Co., Ltd., Osaka, Japan

[21] Appl. No.: 527,971

[22] Filed: May 24, 1990

Related U.S. Application Data

[62] Division of Ser. No. 288,832, Dec. 23, 1988, Pat. No. 4,956,041.

[30] Foreign Application Priority Data

| | | | |
|---|---|---|---|
| Dec. 28, 1987 | [JP] | Japan | 62-332471 |
| Feb. 9, 1988 | [JP] | Japan | 63-28437 |

[51] Int. Cl.⁵ .................................... F16L 55/16
[52] U.S. Cl. ................................ 405/154; 156/287; 156/294; 405/146
[58] Field of Search ............ 405/154, 150, 146; 156/287, 294, 267, 87; 138/97

[56] References Cited

U.S. PATENT DOCUMENTS

| | | | |
|---|---|---|---|
| 2,695,255 | 11/1954 | Avery | 156/287 X |
| 3,114,968 | 12/1963 | Rudelick | 156/287 X |
| 4,135,958 | 1/1979 | Wood | 156/287 X |
| 4,361,451 | 11/1982 | Renaud | 156/294 |
| 4,714,095 | 12/1987 | Muller et al. | 156/294 X |
| 4,770,562 | 9/1988 | Muller et al. | 405/154 |
| 4,778,553 | 10/1988 | Wood | 156/287 |
| 4,950,446 | 8/1990 | Kinumoto et al. | 156/287 X |

FOREIGN PATENT DOCUMENTS 58-88281 5/1983 Japan .

*Primary Examiner*—Dennis L. Taylor
*Attorney, Agent, or Firm*—Armstrong, Nikaido, Marmelstein, Kubovcik & Murray

[57] ABSTRACT

A method of forming a rigid or semirigid plastics tube lining over the inner surface of a branch pipe portion as joined at its one end to an underground main pipe through the other end thereof substantially open to the surface of the ground as a work opening, the method being characterized by inserting a rigid or semirigid plastics tube into the branch pipe portion from the work opening with the forward end of the tube substantially closed, and subsequently supplying a fluid into the tube to inflate the tube radially of the branch pipe by applying heat and pressure to the tube with the fluid from inside directly or indirectly and thereby line the branch pipe portion with the rigid plastics tube. The pipe portion can be lined from the ground surface efficiently without necessitating labor for excavation of the ground, cutting off the branch pipe portion and restoring the piping to the original state.

2 Claims, 8 Drawing Sheets

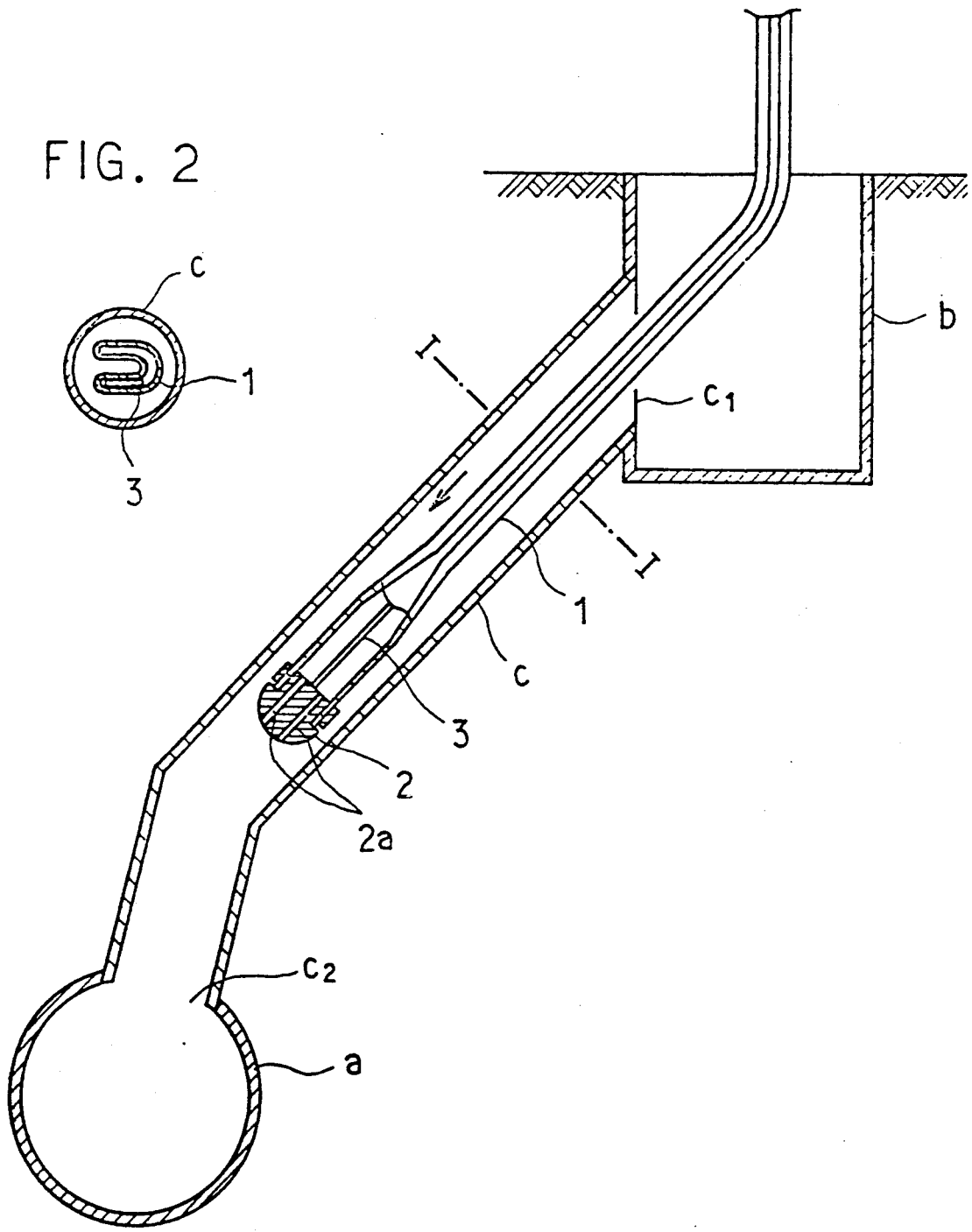

METHOD OF LINING BRANCH PIPE PORTION OF UNDERGROUND MAIN PIPE WITH RIGID PLASTICS TUBE

This application is a division of application Ser. No. 07/288,832, filed Dec. 23, 1988, now U.S. Pat. No. 4,956,041.

TECHNICAL FIELD

The present invention relates to a method of lining branch pipe portions of underground main pipes with a rigid plastics tube, and more particularly to a method of forming a rigid plastics tube lining over the inner surface of the branch pipe portion as connected at its one end to the underground main pipe through the opening at the other end thereof, i.e., from the surface of the ground.

BACKGROUND ART

A method of lining pipes is already known wherein a rigid plastics tube inserted in the pipe and having a smaller diameter than the pipe is inflated radially of the pipe by applying heat and pressure to the tube from inside and thereby line the pipe with the rigid plastics tube (see, for example, Unexamined Japanese Patent Publication No.88281/1983).

The rigid plastics tube lining is hard, therefore retains itself in the pipe lining state and is more excellent in quality than the soft tube lining which is bonded with an adhesive to the pipe for lining.

No particular problem is experienced in using the rigid plastics tube lining method for lining underground main pipes such as water supply pipes, gas pipes and sewer pipes, whereas a problem arises when a branch pipe portion extending from the main pipe to the surface of the ground is to be lined by this method. Since the branch pipe portion has one end connected to the main pipe, it is very difficult to carry out lining work through the opening of the other end which only is usable as a work opening.

In this case, the problem can be eliminated by excavating the ground and cutting off the branch pipe portion from the main pipe to form another work opening and line the pipe portion through both ends as in the usual work condition. However, this requires much labor and time for excavating the ground, cutting off the branch pipe portion and restoring the piping to the original state, hence an undesirable solution.

DISCLOSURE OF THE INVENTION

The main object of the present invention is to provide a method of lining a branch pipe portion of an underground main pipe with a rigid plastics tube easily and reliably through one end of the branch pipe portion from the surface of the ground.

Other features of the invention will become apparent from the following description.

The present invention provides a method of forming a rigid or semirigid plastics tube lining over the inner surface of a branch pipe portion as joined at its one end to an underground main pipe through the other end thereof substantially open to the surface of the ground as a work opening, the method being characterized by inserting a rigid or semirigid plastics tube into the branch pipe portion from the work opening with the forward end of the tube substantially closed until the closed end is brought into the main pipe, subsequently supplying a fluid into the tube to inflate the tube radially of the branch pipe by applying heat and pressure to the tube with the fluid from inside and thereby line the branch pipe portion with the rigid plastics tube, and cutting off and removing an unnecessary end portion of the lining inside the main pipe by a cutting device movable through the main pipe by remote control (hereinafter referred to as the "first method").

The invention further provides a method of forming a rigid or semirigid plastics tube lining over the inner surface of a branch pipe portion as joined at its one end to an underground main pipe through the other end thereof substantially open to the surface of the ground as a work opening, the method being characterized by inserting a rigid or semirigid plastics tube into the branch pipe portion from the work opening with the forward end of the tube left open until the forward end reaches an opening at said one end of the branch pipe portion, subsequently applying heat and pressure to the rigid plastics tube with a fluid from inside through a collapsibly inflatable soft tube freely inserted in the rigid plastics tube over the entire length thereof to inflate the rigid plastics tube radially of the branch pipe and thereby line the branch pipe portion with the rigid plastics tube, and thereafter withdrawing the soft tube from inside the lining (hereinafter referred to as the "second method").

The methods of the present invention are used for lining branch pipe portions branching toward the surface of the ground from underground main pipes such as water supply main pipes, gas main pipes and sewer main pipes.

The methods of the invention are practiced for the branch pipe portion as joined at its one end to the underground main pipe through the branch pipe other end which is substantially open to the surface of the ground as a work opening.

When the main pipe is a water main or gas main, the branch pipe other end is removed at the portion where a meter is mounted for the user so that the branch pipe portion is opened to the surface of the ground. When the main pipe is a sewer, the branch pipe other end is joined to a gully in a gutter formed in the ground surface and left open to the ground surface at the junction. The branch pipe other end thus open to the ground surface is utilized as a work opening.

The rigid or semirigid plastics tube to be used for lining by the methods of the invention must be thermoplastic so as to be inflatable by the heat and pressure applied thereto by a fluid from inside. The rigid plastics tube is usually made of polyvinyl chloride, polyethylene, polypropylene or like material which is 60° to 100° C., preferably about 70° to about 95° C., in softening point.

The rigid plastics tube made of the above material is circular in cross section and has an outside diameter smaller than the inside diameter of the branch pipe portion, for example, an outside diameter corresponding to about 50 to about 90% of the inside diameter.

The rigid plastics tube has such a wall thickness that the resulting lining is capable of retaining its shape and strength for use as such without application of any adhesive. Usually, the thickness is in the range of about 1 to about 10 mm and is determined according to the inflation ratio, outside diameter, material, etc.

The rigid or semirigid plastics tube is used as shaped to a circular cross section or as collapsed radially to the form of a belt. The tube is collapsed to the belt form preferably as softened by heating. The rigid plastics tube thus deformed is flexible owing to its belt form and inherent elasticity and insertable through a bent branch pipe portion free of trouble. If the rigid plastics tube in the form of a belt is likely to buckle when passing through the bend, the tube can be prevented from buckling by being reinforced with a linear spring member inserted therethrough before use.

The fluid to be used for applying heat and pressure to the rigid plastics tube from inside is not limited specifically but is preferably steam which has a great heat capacity, becomes water on condensation and is dischargeable as it is without entailing any pollution.

The fluid has a temperature higher than the softening point of the rigid plastics tube and a pressure which overcomes the tensile strength of the rigid plastics tube as softened by heating.

With the first method of the invention, the rigid plastics tube is inserted, with its forward end closed with a front plug, into the branch pipe portion through the other end thereof serving as a work opening. When the rigid plastics tube is continuously inserted, the forward end of the rigid plastics tube passes through the branch pipe end joined to the main pipe, strikes against the wall of the main pipe inside thereof and becomes no longer insertable, so that the rigid plastics tube can be inserted through the branch pipe portion over the entire length thereof without the necessity of measuring the length of the branch pipe portion. The rigid plastics tube may be inserted into the branch pipe portion while being heated with steam or like fluid from inside.

After the rigid plastics tube has been inserted through the branch pipe portion, the heating and pressurizing fluid is supplied to the inside of the tube to inflate the tube radially thereof with heat and pressure, whereby the branch pipe portion can be lined with the rigid plastics tube.

After the rigid plastics tube lining has been formed, the forward end portion of the lining remains inside the main pipe. The unnecessary end portion of the lining is cut off and removed by a cutting device which is movable through the main pipe by remote control. Such a cutting device can be obtained, for example, by mounting on a work machine movable through the main pipe by remote control a hollow cylindrical cutter having a saw-toothed forward end and drive means for rotating the cutter about its center axis.

The first method of the present invention is adapted to line a branch pipe portion with a rigid plastics tube through the other end opening of the pipe portion as a work opening, i.e. from the surface of the ground. Accordingly, the method requires little or no restoring work after lining, consequently achieving savings in labor and time for a cost reduction.

The second method of the invention is substantially the same as the first method but differs therefrom in the following features.

(a) The rigid plastics tube is inserted into the branch pipe portion to position the forward end of the rigid plastics tube in coincidence with one end (joined to the main pipe) of the branch pipe portion without projecting the tube end into the main pipe.

(b) Heat and pressure are applied indirectly to the rigid plastics tube inserted in the branch pipe portion through a soft tube inserted through the rigid plastics tube to inflate the rigid plastics tube and line the branch pipe portion with the rigid plastics tube.

According to the second method, the rigid plastics tube does not project into the main pipe, so that no unnecessary end portion of the rigid plastics tube lining remains within the main pipe. Thus, the second method is superior to the first method in that the unnecessary end portion need not be cut off and removed from inside the main pipe.

With the second method, the soft tube to be used for inflating the rigid plastics tube is made, for example, of heat- and pressure-resistant rubber, free to inflate and collapse and recovered by being drawn out from the rigid plastics tube lining to above the ground after the lining operation.

Before practicing the second method, it is necessary to measure the length of the branch pipe portion to position the forward end of the rigid plastics tube in coincidence with the above-mentioned one end of the branch pipe portion. The length can be measured, for example, by measuring the overall length of the branch pipe portion inclusive of the diameter of the main pipe with a piano wire inserted through the branch pipe portion through the other end thereof and substracting the diameter of the main pipe from the measurement.

BEST MODE OF PRACTICING THE INVENTION

Embodiments of the invention will be described below with reference to the accompanying drawings, in which:

FIG. 1 is a view in vertical section schematically showing the step of inserting a rigid plastics tube into a branch pipe portion in the first method of the invention;

FIG. 2 is a view in section taken along the line I—I in FIG. 1;

FIGS. 1 to 8 show a mode of lining a branch pipe portion c of an underground sewer main pipe a with a rigid plastics tube 1 by the first method of the invention. The branch pipe portion c has one end joined to the sewer main pipe a and the other end to a gully b in a gutter formed in the surface of the ground.

The rigid plastics tube 1 used for the present embodiment is made of polyvinyl chloride resin and circular in cross section. Being circular in cross section, the rigid plastics tube 1 is capable of retaining the circular cross section with good stability reliably also after inflation.

Based on the circular cross section, the tube 1 has an outside diameter approximately equal to or smaller than the inside diameter of the branch pipe portion c but not smaller than about 50% of the inside diameter. In view of the insertability into the branch pipe portion c, the tube 1 is usually deformed to an approximately U-shaped cross section as seen in FIG. 2 by being collapsed radially thereof. The tube 1 thus deformed to the U-shaped cross section has a decreased outside diameter, is made insertable into the branch pipe portion c more smoothly and is flexible owing to the inherent elasticity of the synthetic resin. Accordingly, the tube is insertable into the branch pipe portion c free of trouble regardless of whether the pipe portion is straight or bent. The tube 1 is pressed for deformation usually as softened by heating.

Before the insertion into the branch pipe portion c, a front plug 2 is fitted to the front end of the tube 1 of decreased outside diameter. The plug 2 has bores 2a extending therethrough longitudinally of the tube 1.

A linear spring member 3 is inserted through the tube 1 over the entire length thereof. The spring member 3 reinforces the tube 1 from inside, prevents the tube 1 from bending greatly and effectively delivers a pushing force to the front end of the tube. The spring member 3 may be dispensed with when the branch pipe portion c is straight. FIG. 2 shows a steel strip which is especially desirable as the linear spring member 3 for backing up the tube 1 from inside over a large width.

FIG. 1 shows the step of inserting the rigid plastics tube 1 into the branch pipe portion c. The tube 1 is inserted by being pushed from above the ground through the outer end opening c1 of the branch pipe portion c. The tube 1 is so pushed manually or by suitable mechanical means.

Figure 3:
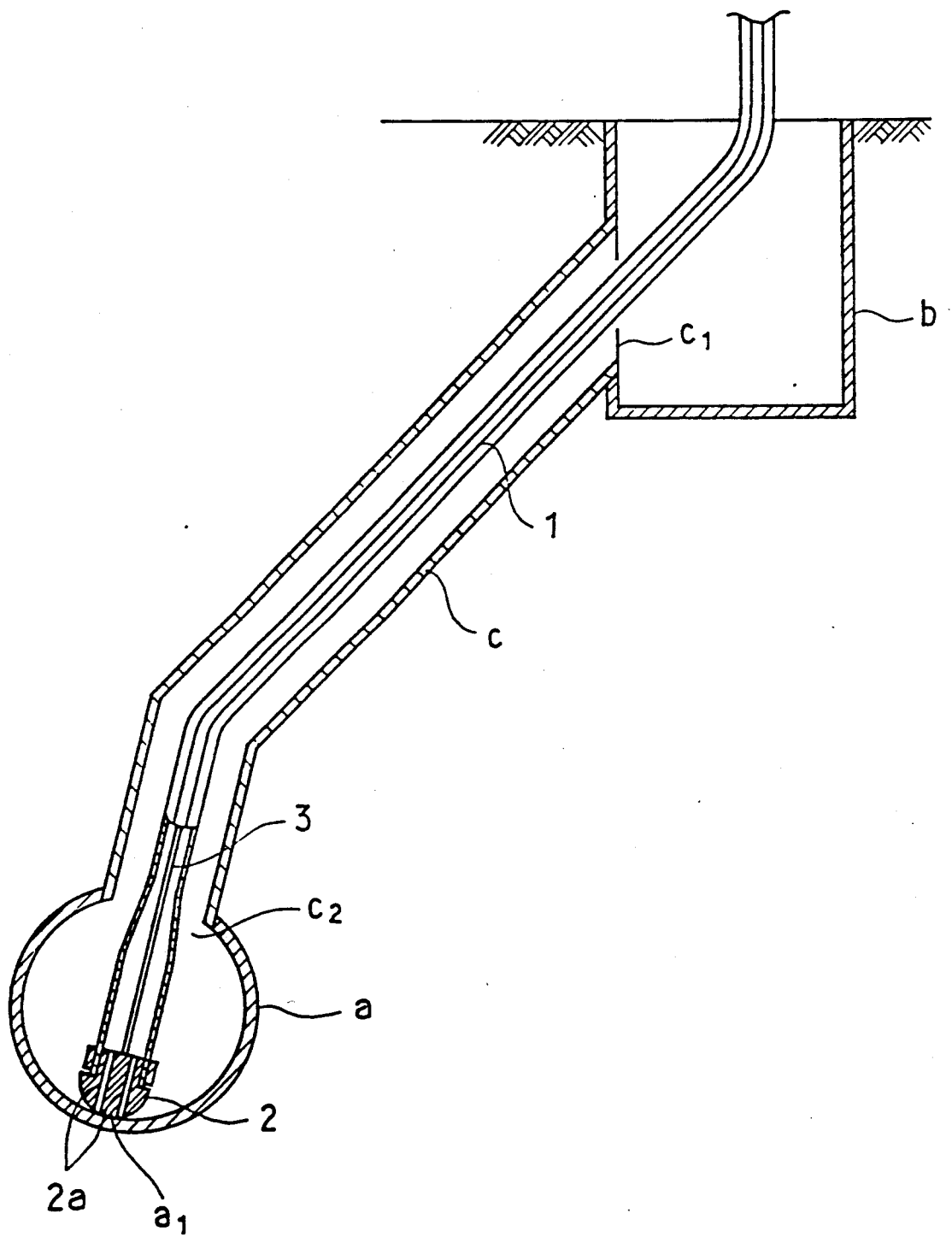
FIG. 3 is a view in vertical section schematically showing the rigid plastics tube as completely inserted.

With reference to FIG. 3, the rigid plastics tube 1 inserted into the branch pipe portion c passes through the inner end opening c2 of the pipe portion c and reaches the wall a1, opposite to the opening c2, of the main pipe a. The spring member 3 is then withdrawn from the tube 1 to complete the insertion of the tube 1 through the branch pipe portion c.

Figure 4:
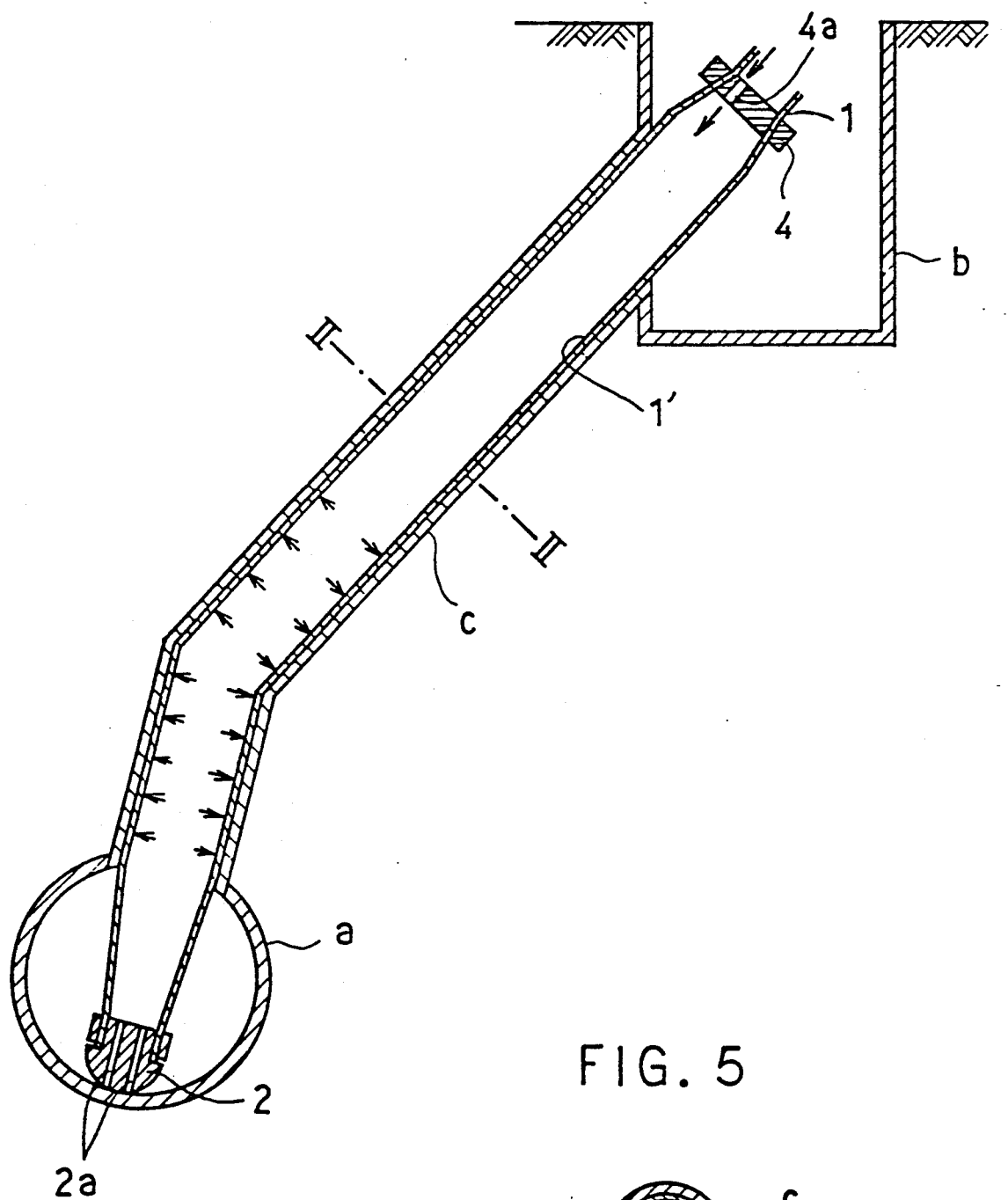
FIG. 4 is a view in vertical section schematically showing the step of inflating the rigid plastics tube.
Figure 5:
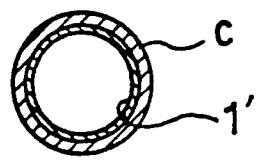
FIG. 5 is a view in section taken along the line II—II in FIG. 4.

After the rigid plastics tube 1 has been completely inserted through the branch pipe portion c, a rear plug 4 is fitted to the rear end of the tube 1 as seen in FIG. 4, and the heating fluid, e.g. steam, is supplied to the interior of the tube 1 through a supply hole 4a. The steam supplied from the rear end of tube 1 flow through the tube 1 toward the front end thereof and is discharged from the bores 2a of the plug 2 while heat and pressure are applied to the tube 1 from inside, inflating the tube 1 radially of the branch pipe to cause the tube to cover the inner surface of the branch pipe portion c. After the tube 1 is inflated to completely cover the inner surface of the pipe portion c, the steam is replaced by outside air with the tube 1 as held internally pressurized to solidify the inflated tube 1' by cooling. After solidification of the tube 1', the pressure applied by the outside air is released from the tube 1'.

Figure 6:
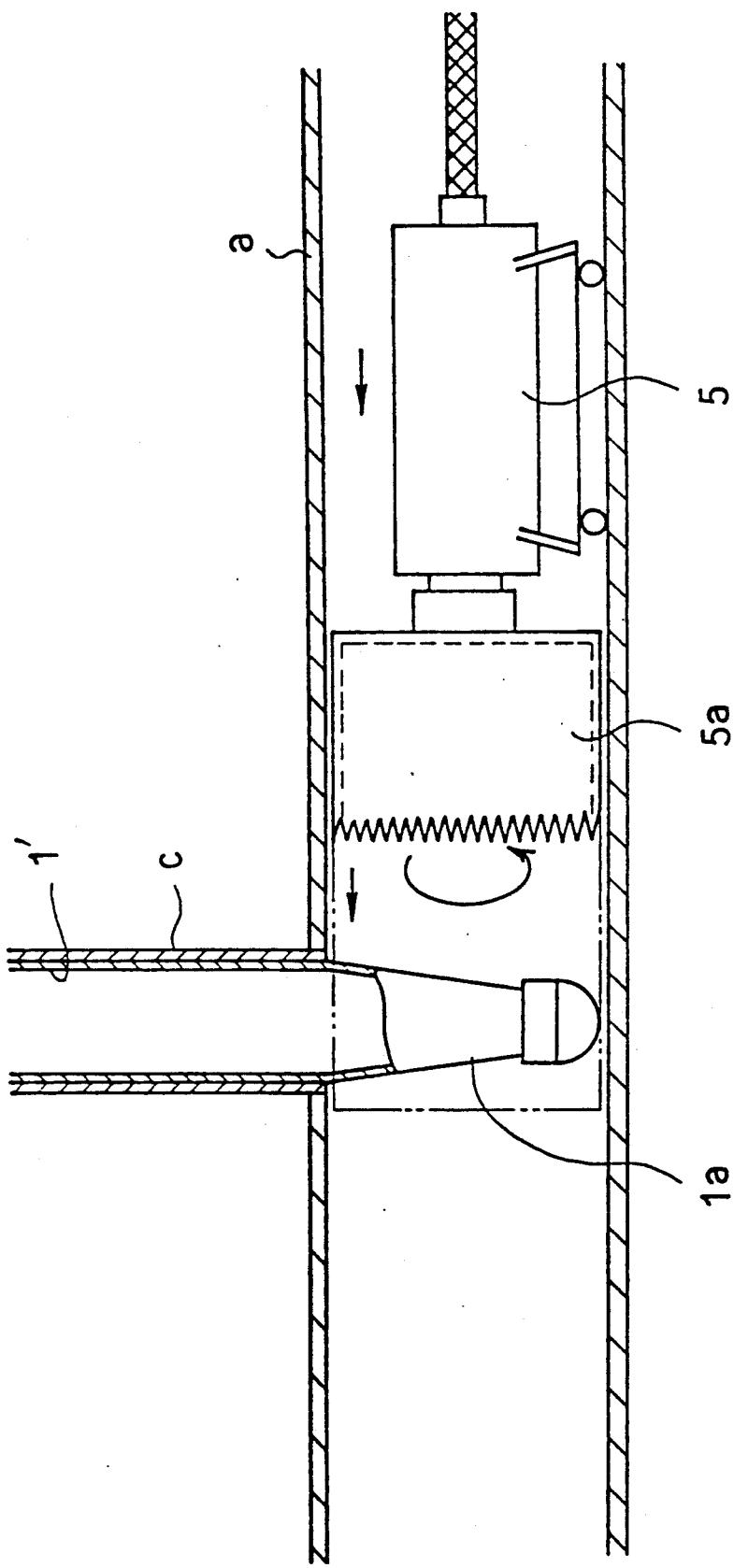
FIG. 6 is an enlarged fragmentary view in section schematically showing how to cut off an unnecessary end portion of the rigid plastics tube inside a main pipe.

As shown in detail in FIG. 6, the tube 1 lining the pipe portion c has a front end portion 1a projecting into the main pipe a, so that the projecting end portion 1a, which is unnecessary, is cut off and removed by a cutting device 5 which is movable through the main pipe a by remote control, whereby the entire work is completed. The end portion is cut off and removed from the main pipe a utilizing as work openings manholes (not shown) which are provided at a suitable spacing along the main pipe a.

The cutting device 5 is one which is capable of cutting off and removing the tube end portion 1a inside the main pipe a by remote control, for example, one having a cylindrical rotary cutter 5a at the front end with respect to the direction of advance of the device.

The lining thus obtained is formed by the rigid plastics tube 1 and is therefore capable of fully withstanding the underground water pressure penetrating through the joints (not shown) or the like of the branch pipe portion from outside.

Figures 7, 8:
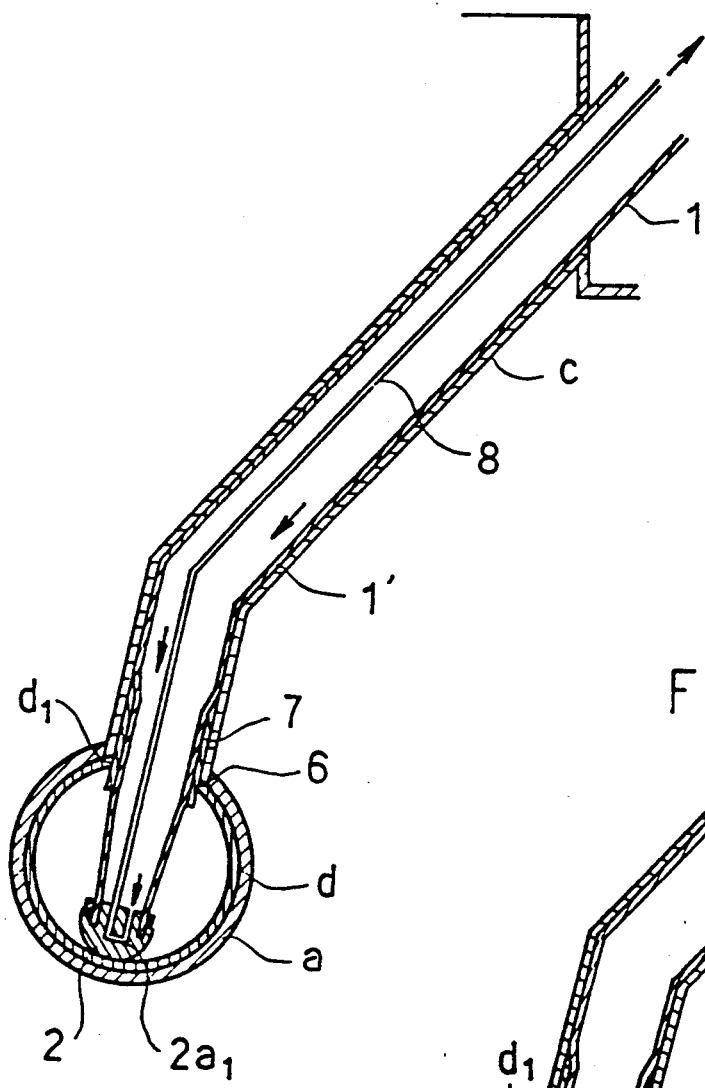
FIG. 7 is a view in vertical section schematically showing a modification of the first method.
FIG. 8 is a fragmentary sectional view showing the same on completion of lining operation.
Figure 9:
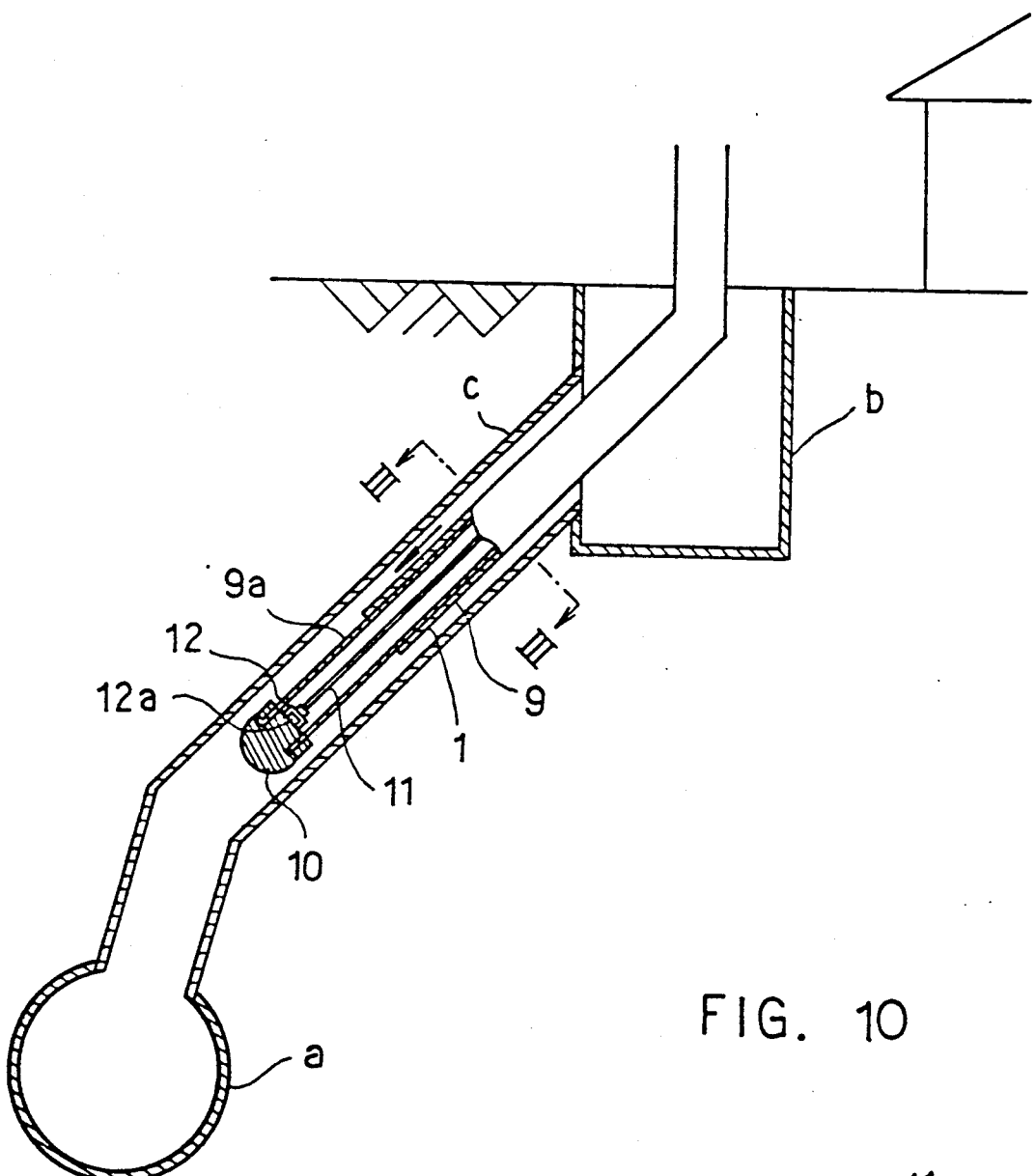
FIG. 9 is a view in vertical section schematically showing the step of inserting a rigid plastics tube into a branch pipe portion in the second method.
Figure 10:
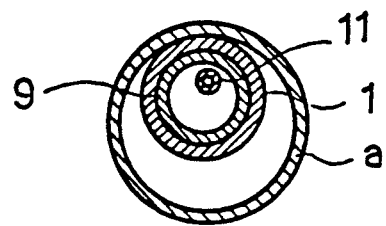
FIG. 10 is a view in section taken along the line III—III in FIG. 9.

When the main pipe a has a tube lining d as seen in FIGS. 7 and 9, it is desirable to seal the junction 6 between an opening portion d1 for opening the branch pipe portion c and the branch pipe portion tube lining 1' fitted in the opening portion d1. The junction 6 can be sealed by fitting a rubberlike elastic tubular member 7, uncoated or coated with an adhesive (not shown) on its outer periphery, around the desired portion of the rigid plastics tube 1 to be made into the tube lining 1' on the branch pipe portion c, and pressing the tubular member 7 against the opening portion d1 of the tube lining d on the main pipe a at the junction 6 when inflating the rigid plastics tube 1. The tubular member 7 may be of the hotmelt type. If the steam supplied to the tube 1 is injected into the main pipe a through the bore 2a in the front plug 2 in this case as in the above embodiment, the tube lining d on the main pipe is liable to become unlevel by being locally softened by heating, so that it is desirable to discharge to above the ground the steam supplied to the tube, via a bore 2a1 of the return type formed in the front plug 2 and a discharge tube 8 communicating with the outlet of the bore.

With the method of the invention, the outer end of the branch pipe portion c joined to the gully b in the gutter is utilized as a work opening for lining the pipe portion c, so that the lining operation can be carried out with an improved efficiency without necessitating a cumbersome procedure such as excavation of the ground. Furthermore, the lining, which is formed by a rigid plastics tube, fully withstands the underground water pressure without application of adhesive, thus covering the pipe portion for a prolonged period of time stably and reliably.

FIGS. 9 to 13 show a mode of practicing the second method of the invention.

The rigid plastics tube 1 to be used in the present embodiment is circular in cross section and has an outside diameter corresponding to about 75% of the inside diameter of the branch pipe portion c to be lined. The tube 1 is used as shaped to the circular cross section without collapsing.

Before the tube 1 is inserted into the pipe portion c, a collapsibly inflatable heat-resistant tube 9 is inserted through the rigid plastics tube 1 over the entire length thereof.

The forward end of the tube 9 is projected outward beyond the rigid plastics tube 1, and the end of the projection 9a is closed with a front plug 10. The outside diameter of the front plug 10 is smaller than the inside diameter of the rigid plastics tube 1 as inflated to form a lining. A heat-resistant hose 11 is inserted through the tube 9 and has a forward end secured to the inner end of the front plug 10 and the other end extending outward from the tube 9. The hose 11 is provided at its forward end with a metal member 12 having a communication opening 12a for holding the interior of the tube 9 in communication with the interior of the hose 11.

To line the branch pipe portion c with the rigid plastics tube, the rigid plastics tube 1 having the heat-resistant tube 9 inserted therethrough is inserted into the pipe portion c through a work opening, i.e., an opening at its outer end joined to the gully b in the gutter. When the inserted end of the rigid plastics tube 1 is positioned in coincidence with the open inner end of the branch pipe portion c, the insertion is discontinued. The inserted forward end of the rigid plastics tube 1 can be positioned in coincidence with the inner end of the branch pipe portion c by inserting the tube 1 by a length corresponding to the length of the pipe portion c which is measured in advance. Alternatively, this can be accomplished by making the length of the projection 9a of the heat-resistant tube 9 equal to the diameter of the main pipe a.

When the branch pipe portion c has a a bent portion, the rigid plastics tube 1 is inserted as softened by being internally heated with steam or the like. Since the rigid plastics tube 1 is liable to collapse when not backed up from inside, the rigid plastics tube 1 is inserted into the branch pipe portion c preferably while being supported from inside by the heat-resistant tube 9 inserted through the tube 1 by inflating the tube 9 to such an extent as will not inflate the rigid plastics tube 1. When desired, the steel strip 3 shown in FIG. 2 may be used in combination with the inflated tube 9.

Figure 11:
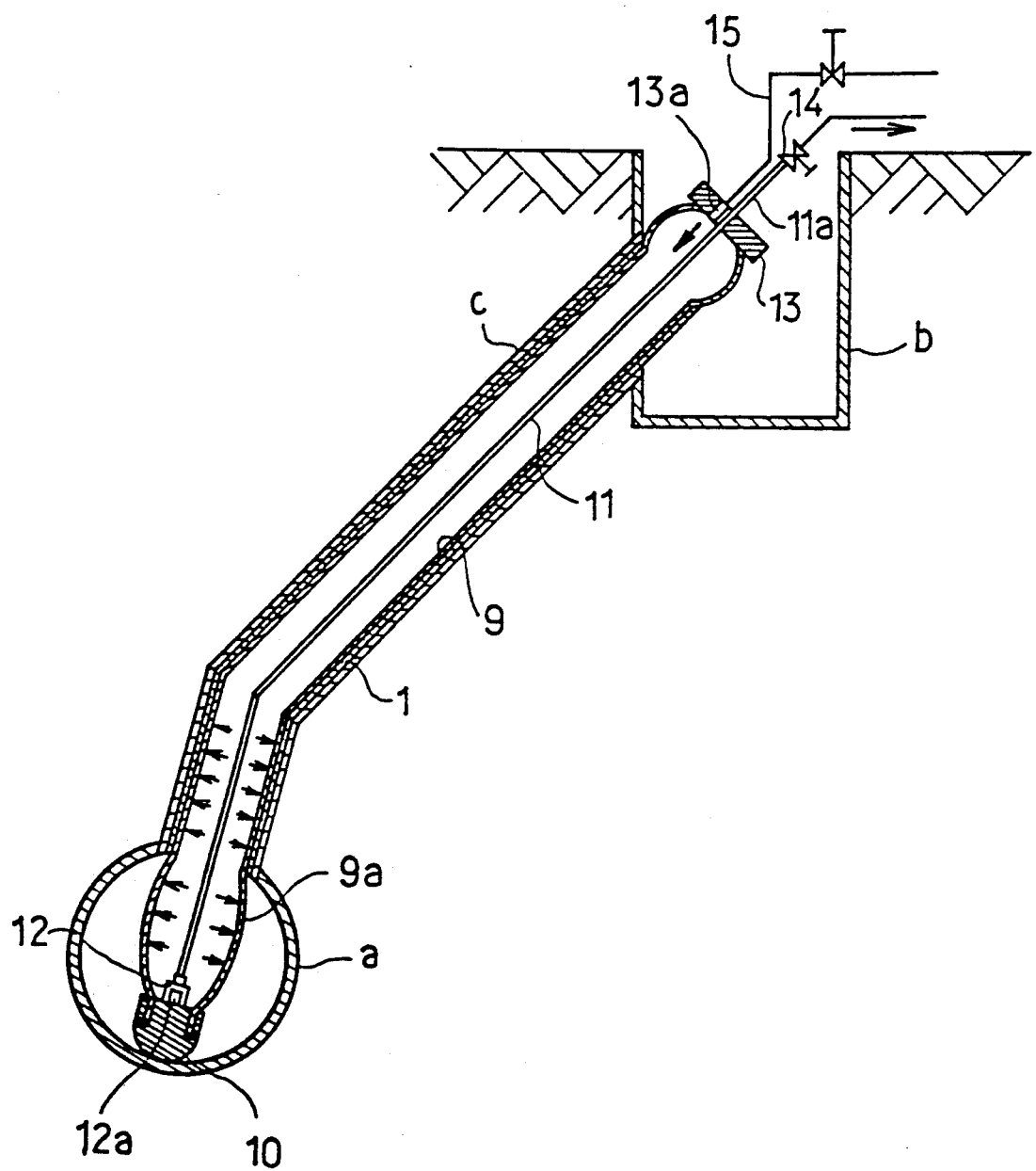
FIG. 11 is a view in vertical section schematically showing the step of inflating the rigid plastics tube.

After the rigid plastics tube 1 has been inserted into the branch pipe portion c along with the heat-resistant tube 9, the tube 9 is closed at the rear end with a rear stopper 13 as seen in FIG. 11. The rear end of the rubber hose 11 is withdrawn from the pipe portion c and the tube 9 through the rear stopper 13, and a shutoff valve 14 is attached to the withdrawn end 11a.

When steam is supplied from a boiler (not shown) to the interior of the heat-resistant tube 9 through a conduit 15 and then through a supply opening 13a in the rear stopper 13 in the state shown in FIG. 11, the steam flows through the tube 9 from its rear end toward the front end thereof while heating the outside rigid plastics tube 1 through the tube 9 and is discharged via the communication opening 12a of the metal member 12 and then via the rubber hose 11. Instead of passing the steam through the rubber hose 11, the steam may be discharged through an outlet (not shown) formed in the front plug 10.

After the rigid plastics tube 1 is heated and softened by the steam, the opening of the valve 14 is adjusted to increase the steam pressure within the tube 9, causing the steam to inflate the tube 9 and therefore the outside rigid plastics tube 1 radially of the pipe portion to line the branch portion c with the tube 1.

After the branch pipe portion c has been lined with the rigid plastics tube 1, the steam is replaced by outside air with the internal pressure maintained in the tube 9, whereupon the rigid plastics tube 1 is cooled and solidified with the outside air. Subsequently, the pressure is released from the tube 9 to contract the tube 9 to recover the tube 9 from inside the rigid plastics tube 1, whereby the entire lining operation is completed.

Figure 12:
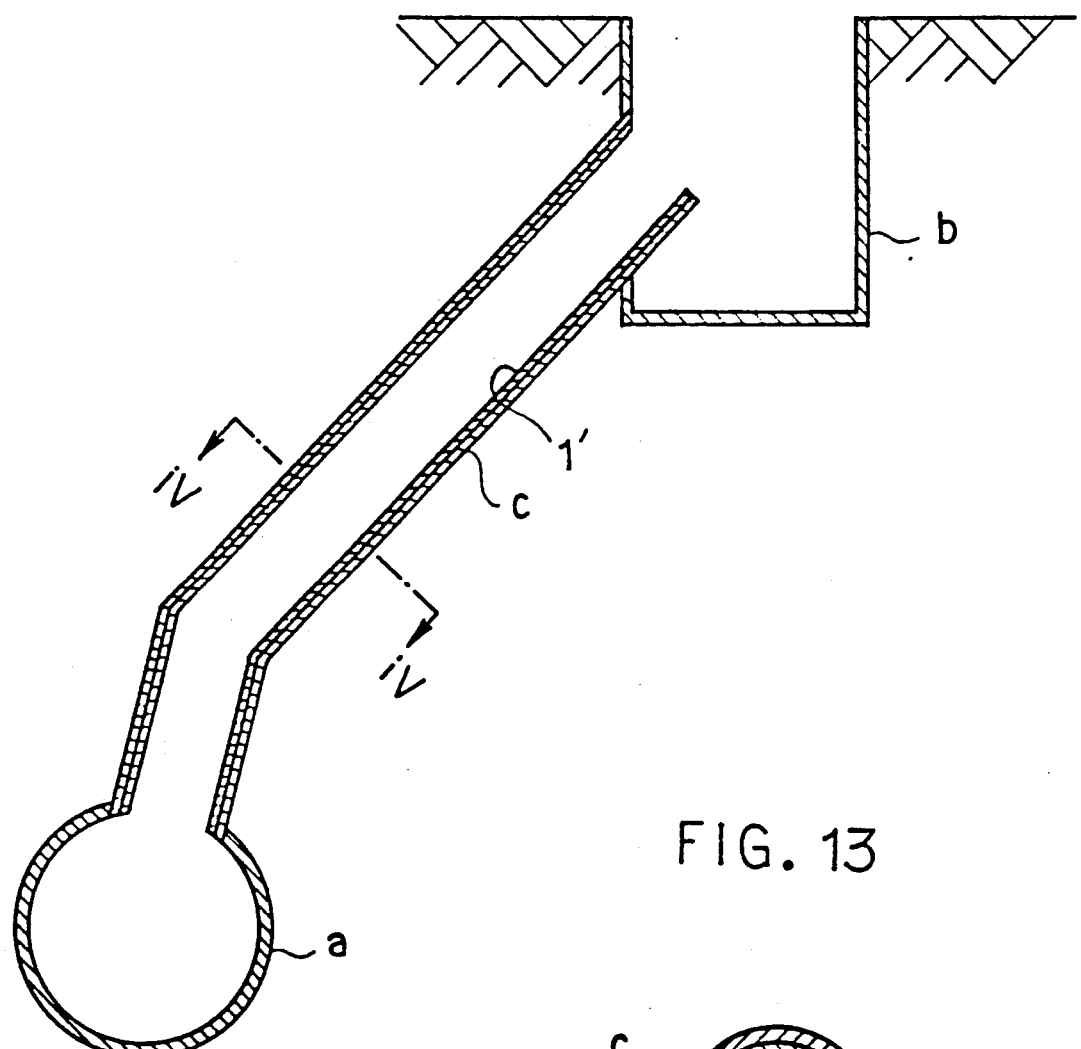
FIG. 12 is a view in vertical section schematically showing a rigid plastics tube lining formed.
Figure 13:
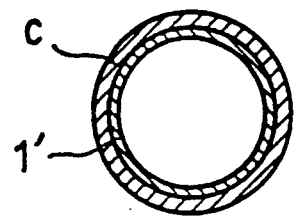
FIG. 13 is a view in section taken along the line IV—IV in FIG. 12.

FIGS. 12 and 13 shown the branch pipe portion c formed with a rigid plastics tube lining 1' over its inner surface. The tube lining 1' is rigid, retains its shape and accordingly thereafter holds the pipe portion covered therewith stably and reliably.

With the second method, the unnecessary end portion formed inside the main pipe a by the first method need not be cut off. Thus, the second method has the feature of being greatly improved in lining efficiency.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A method of forming a rigid or semirigid plastic tube lining over an inner surface of a branch pipe portion having one end thereof joined to an underground main pipe with another end thereof substantially open to the surface of the ground as a work opening, said method comprising the steps of:

inserting a rigid or semirigid plastic tube into said branch pipe portion from said work opening with a forward end of said plastic tube left open until said forward end of said plastic tube reaches an opening at said one end of said branch pipe portion joined to said underground main pipe;

applying heat and pressure to an inside portion of said rigid or semirigid plastic tube with a fluid through a collapsible inflatable soft tube freely inserted in said rigid or semirigid plastic tube over the entire length thereof;

discharging said fluid through a hose mounted within said rigid or semirigid plastic tube;

inflating said rigid or semirigid plastic tube radially of said branch pipe;

lining said branch pipe portion with said rigid or semirigid plastic tube; and withdrawing said soft tube from inside said branched pipe lined with said rigid or semirigid plastic tube.

2. A method as defined in claim 1, wherein said step of applying heat and pressure to said rigid or semirigid plastic tube includes the step of applying steam.

* * * * *